(12) United States Patent
Wu

(10) Patent No.: US 10,574,583 B2
(45) Date of Patent: Feb. 25, 2020

(54) METHOD AND APPARATUS FOR COMBINED ACCESS NETWORK AND HOME NETWORK USING A DUAL-ROLE DEVICE

(71) Applicant: ENTROPIC COMMUNICATIONS, LLC, Carlsbad, CA (US)

(72) Inventor: Zongliang Wu, San Diego, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 0 days.

(21) Appl. No.: 14/908,645

(22) PCT Filed: Jul. 29, 2014

(86) PCT No.: PCT/US2014/048591
§ 371 (c)(1),
(2) Date: Jan. 29, 2016

(87) PCT Pub. No.: WO2015/017397
PCT Pub. Date: Feb. 5, 2015

(65) Prior Publication Data
US 2016/0173396 A1    Jun. 16, 2016

Related U.S. Application Data

(60) Provisional application No. 61/859,973, filed on Jul. 30, 2013.

(51) Int. Cl.
*H04L 12/841* (2013.01)
*H04L 12/24* (2006.01)
*H04L 12/801* (2013.01)
*H04W 28/00* (2009.01)
*H04W 40/02* (2009.01)

(52) U.S. Cl.
CPC .......... *H04L 47/283* (2013.01); *H04L 41/046* (2013.01); *H04L 47/14* (2013.01); *H04W 28/00* (2013.01); *H04W 40/02* (2013.01)

(58) Field of Classification Search
None
See application file for complete search history.

(56) References Cited

U.S. PATENT DOCUMENTS

| | | | | |
|---|---|---|---|---|
| 8,085,802 B1 * | 12/2011 | Monk | ................... | H04L 5/0046 370/419 |
| 8,181,208 B1 | 5/2012 | Elwardani | | |
| 8,438,607 B2 * | 5/2013 | Cholas | ............... | H04N 21/4147 725/112 |
| 8,498,656 B2 * | 7/2013 | Mujtaba | ............... | H04B 7/0814 455/458 |
| 9,559,983 B1 * | 1/2017 | Ramesh | ............. | H04L 12/4633 |

(Continued)

OTHER PUBLICATIONS

PCT International Preliminary Report dated Feb. 11, 2016 for PCT Patent Application No. PCT/US2014/048591.
(Continued)

*Primary Examiner* — Andrew C Oh
(74) *Attorney, Agent, or Firm* — Maschoff Brennan

(57) ABSTRACT

Systems and methods for using a dual role device (DRD), the DRD having a first mode in which the DRD functions as a customer premise equipment (CPE) node in a first network and a second mode in which the DRD functions as a network controller (NC) node in a second network.

20 Claims, 11 Drawing Sheets

(56) References Cited

U.S. PATENT DOCUMENTS

| | | | | |
|---|---|---|---|---|
| 10,033,618 | B1* | 7/2018 | Grinkemeyer | H04L 43/08 |
| 2001/0048667 | A1* | 12/2001 | Hamdi | H04L 1/0001 |
| | | | | 370/252 |
| 2001/0053207 | A1* | 12/2001 | Jeon | H04B 3/542 |
| | | | | 379/90.01 |
| 2002/0049862 | A1* | 4/2002 | Gladney | H04L 12/2854 |
| | | | | 709/250 |
| 2003/0008667 | A1* | 1/2003 | Forrester | G01S 19/36 |
| | | | | 455/456.1 |
| 2004/0001501 | A1* | 1/2004 | Delveaux | H04L 12/4035 |
| | | | | 370/442 |
| 2005/0034159 | A1* | 2/2005 | Ophir | H04L 12/2801 |
| | | | | 725/78 |
| 2006/0023609 | A1 | 2/2006 | Yamamoto et al. | |
| 2006/0101495 | A1* | 5/2006 | Yoshida | H04L 12/2801 |
| | | | | 725/78 |
| 2007/0153723 | A1* | 7/2007 | Souissi | H04L 45/00 |
| | | | | 370/328 |
| 2008/0123568 | A1* | 5/2008 | Rofougaran | H04L 12/2801 |
| | | | | 370/279 |
| 2009/0180782 | A1* | 7/2009 | Bernard | H04B 10/25751 |
| | | | | 398/140 |
| 2010/0008322 | A1* | 1/2010 | Bossler | H04B 7/0608 |
| | | | | 370/331 |
| 2010/0031297 | A1* | 2/2010 | Klein | H04L 12/12 |
| | | | | 725/78 |
| 2010/0074263 | A1* | 3/2010 | Bry | H04L 12/2834 |
| | | | | 370/401 |
| 2010/0142378 | A1* | 6/2010 | Matheney | H04L 12/2801 |
| | | | | 370/241 |
| 2010/0146616 | A1* | 6/2010 | Garrett | H04L 12/2861 |
| | | | | 726/11 |
| 2010/0162329 | A1* | 6/2010 | Ford | H04L 12/2801 |
| | | | | 725/81 |
| 2010/0284474 | A1* | 11/2010 | Kliger | H04L 5/0007 |
| | | | | 375/257 |
| 2011/0001833 | A1* | 1/2011 | Grinkemeyer | H04H 20/12 |
| | | | | 348/192 |
| 2011/0113455 | A1* | 5/2011 | Wu | H04L 12/2801 |
| | | | | 725/82 |
| 2011/0206042 | A1* | 8/2011 | Tarrab | H04L 12/2801 |
| | | | | 370/389 |
| 2011/0210901 | A1* | 9/2011 | Tikka | H01Q 1/242 |
| | | | | 343/853 |
| 2011/0234316 | A1* | 9/2011 | Kim | H03F 1/56 |
| | | | | 330/192 |
| 2011/0235610 | A1* | 9/2011 | Oksman | H04L 12/4035 |
| | | | | 370/329 |
| 2011/0271313 | A1* | 11/2011 | Urban | H04L 12/2861 |
| | | | | 725/109 |
| 2011/0310213 | A1* | 12/2011 | Garcia | H04M 3/42042 |
| | | | | 348/14.05 |
| 2012/0017253 | A1* | 1/2012 | Hicks, III | H04N 21/4122 |
| | | | | 725/114 |
| 2012/0034912 | A1* | 2/2012 | Kamdar | H04L 47/20 |
| | | | | 455/425 |
| 2012/0093151 | A1* | 4/2012 | McFarland | H04B 3/54 |
| | | | | 370/389 |
| 2012/0126887 | A1* | 5/2012 | Han | H03F 1/0277 |
| | | | | 330/53 |
| 2012/0224566 | A1* | 9/2012 | O'Leary | H04L 63/164 |
| | | | | 370/338 |
| 2012/0246331 | A1* | 9/2012 | Heller | H04L 12/2832 |
| | | | | 709/230 |
| 2013/0097240 | A1* | 4/2013 | Ling | G06F 1/3209 |
| | | | | 709/204 |
| 2013/0128716 | A1* | 5/2013 | Reddy | H04L 12/2801 |
| | | | | 370/201 |
| 2013/0235822 | A1* | 9/2013 | Scherer | H04L 12/2887 |
| | | | | 370/329 |
| 2013/0236177 | A1* | 9/2013 | Fang | H04L 12/2801 |
| | | | | 398/66 |
| 2013/0279369 | A1* | 10/2013 | Drooghaag | H04L 1/0009 |
| | | | | 370/254 |
| 2013/0329714 | A1* | 12/2013 | Fan | H04W 40/12 |
| | | | | 370/338 |
| 2014/0192803 | A1* | 7/2014 | Malik | H04L 45/00 |
| | | | | 370/389 |
| 2015/0163167 | A1* | 6/2015 | Liu | H04L 47/828 |
| | | | | 370/230 |
| 2015/0236747 | A1* | 8/2015 | Baudin | H04B 1/401 |
| | | | | 375/219 |
| 2015/0326380 | A1* | 11/2015 | Verbin | H04L 5/1438 |
| | | | | 370/252 |

OTHER PUBLICATIONS

International Search Report corresponding to International Patent Application No. PCT/US2014/048591, dated Jan. 9, 2015.

* cited by examiner

METHOD AND APPARATUS FOR COMBINED ACCESS NETWORK AND HOME NETWORK USING A DUAL-ROLE DEVICE

RELATED APPLICATIONS

This application claims priority benefit of U.S. Provisional Patent Application Ser. No. 61/859,973, filed Jul. 30, 2013 and entitled "Low-cost Architecture for Combined Access Network and Home Network by Using a Dual-Role Device", which is herein incorporated by reference in its entirety.

TECHNICAL FIELD

The disclosed method and apparatus relates to networking and more particularly to means for providing efficient networks inside and into homes for home entertainment networking.

BACKGROUND

It is common today for people to receive information and entertainment content in their homes through networks. For example, many people receive entertainment content through a wide area network (WAN) provided by an MSO (Multi-system Operator), such as a cable television operator or satellite content provider. Typically, such WANs are fashioned as "access networks". An access network provides a point-to-multi-point connection.

FIG. 1 is a simplified block diagram of an access network 100.

A first node 102 of the network, commonly referred to as a "head-end" node provides content to a plurality of CPE (Customer Premise Equipment) nodes 104. The CPE nodes 104 allow users to receive and transmit information to and from the head-end node 102 through the access network 100. While each user can send and receive information to and from the head-end node 102, they cannot communicate directly with other CPE nodes 104 of the access network 100.

In some cases, each CPE node 104 resides within a home. Content that is provided to the home through the access network 100 is then distributed throughout the home over a second network. The second network can be a local area network (LAN), configured as a mesh network. One such LAN is the well-known MoCA (Multi-media Over Coax Alliance) network commonly used today for home entertainment networking.

FIG. 2 is a simplified block diagram of a home 200 having both a MoCA network 201 and a CPE 104 that is part of an access network 100. The access network 100 supplies content from a head-end node 102 to the CPE node 104 within the home 200. In one case, the CPE node 104 is connected to a gateway 202. The gateway 202 provides the content received from the access network 100 to the MoCA network 201. In particular, in accordance with the architecture shown in FIG. 2, the gateway is coupled to a node 204 on the MoCA network 201. The MoCA node 204 distributes content provided from the access network CPE 104 to other MoCA nodes 206, 208, 210 on the MoCA network 201. Likewise, any of the MoCA nodes 204, 206, 208, 210 can transmit information back to the head-end node 102 through the MoCA node 204, the gateway 202, and the CPE node 104. Since the MoCA network is a mesh network, all of the MoCA nodes 204, 206, 208, 210 can communicate directly with each other.

The access network can conform to one of several architectures. One common architecture is called c.LINK. Another is called HiNOC (High Performance Network Over Coax). Both c.LINK and HiNOC are managed access networks. A managed access network is defined as a network in which one of the nodes in the network schedules when each node, including itself, may have access to the network (i.e., when each node is to transmit and receive information over the network).

FIG. 3 is a simplified timing diagram of the transmissions that occur on a HiNOC network. A node called the HiNOC Bridge (HB) schedules the transmissions for all of the other nodes on the network. The other nodes on the network are commonly referred to as HiNOC Modems (HMs). In the case in which the HiNOC network is used to distribute content from an MSO, the HB would be a head-end node and the HMs would be CPE nodes, each located at a user's home.

Transmissions are organized as a continuous stream of access cycles. In the particular embodiment in which the network is a HiNOC network, the access cycles are referred to as Pd (Probing downstream) cycles 300, one of which is shown in FIG. 3. Each Pd cycle 300 includes a Pd control packet 302, a first set of MAP (media access plan) cycles 304, a Pu (Probing upstream) session (consisting of a group of Pu control packets) 306, and a second set of MAP cycles 308. The Pu session is located in the middle of the Pd cycle.

During the Pd control packet 302, the HB conveys downstream control information to all the HMs. This information includes content used to perform channel estimation (i.e., information used to determine the quality/capacity/characteristics of the channel), control information regarding the network management, and information used to allow link maintenance including admission of new nodes to the network, etc.

The first set of MAP cycles 304 comprises an inter-frame gap (IFG) 312 followed by several MAP cycles 310. Each MAP cycle 310 has several downlink slots 314 during which information can be transmitted downstream from the HB to one or more HMs. The downlink slots 314 are followed by a MAP packet 316. Several uplink slots 318 follow the MAP packet 316. The HB allocates each uplink slot for use by one of the HMs. Some slots are designated to always serve as either an uplink slot 314 or downlink slot 318. However, a number of the slots are designated as dynamic downlink/uplink slots 324 and can be used as either an uplink slot or a downlink slot. The MAP packet 316 separates those dynamic downlink/uplink slots 324 designated for use as downlink slots from those designated for use as uplink slots. In addition, the MAP packet schedules the allocations for the next MAP cycle. Another IFG 322 separates each MAP cycle 310 from the MAP cycle that follows.

The Pu session 306 follows the first set of MAP cycles 304. The Pu session 306 includes Pu slots 326, each separated by an IFG 328. Pu slots are used to communicate upstream control information. At the end of the Pu session 306, a second set of MAP cycles 308 occurs. The second set of MAP cycles 308 is similar to the first set of MAP cycles 304. The Pd cycle 300 then repeats.

FIG. 4 is a simplified timing diagram of the transmissions that occur on a MoCA network. Transmissions on a MoCA network are organized within a continuous stream of beacon cycles 401. Each beacon cycle 401 is comprised of a beacon 403 followed by several MAP cycles 405.

In another architecture, an MSO provides content to a home over a 4G wireless network like the LTE (Long-Term Evolution) network. FIG. 5 is a simplified block diagram of a home 500 in which an LTE access point 502 is used to provide content from an MSO 504 to the MoCA nodes 506, 508, 510, 512 within the home 500. When an LTE network 514 is used to provide content to a home 500, an LTE terminal 502 may be placed on the roof of the home 500 to receive LTE wireless signals from a cellular network. The LTE terminal 502 then communicates with a gateway 516 to provide the content to a MoCA network 518 in the home 500.

While these architectures work reasonably well, they have some drawbacks. First, a number of components are required to receive content from the MSO, push the content through the gateway and distribute the content throughout the home. Having so many components increases the cost to the user. Additionally, the use of the gateway between the access network and the MoCA network increases the latency, which is becoming undesirable in more and more situations.

Accordingly, there is presently a desire for an architecture that has fewer components, lower cost, and less latency when transmitting content from an MSO to a user.

SUMMARY

Various embodiments of an architecture for a combined access network and home network using a dual-role device (DRD) are presented. Some of these embodiments are directed toward systems and methods for reducing cost, latency and generally reducing the number of components required in a system for transmitting content from an MSO (Multi-System Operator) over an access network to a user for distribution over a home network, such as a MoCA network.

In accordance with the disclosed method and apparatus, a DRD is provided. The DRD functions as an access network modem node capable of receiving and transmitting communications over a managed access network, such as a HiNOC (High performance Network Over Coax) network, a c.LINK network, etc. In addition, the DRD also functions as a MoCA Network Controller (NC) node capable of scheduling, receiving and transmitting communications over a MoCA network.

The DRD divides its time between serving as an access network node and serving as a MoCA network node. During particular times scheduled through the head-end node of the access network, the DRD functions as a Modem Node within the access network. For example, if the particular access network is a HiNOC network, then the DRD functions as a HiNOC Modem (HM) on the HiNOC network, receiving and transmitting in accordance with the standard protocol of the HiNOC network during times designated by the head-end node in coordination with the DRD. At those times when the DRD is not required to be attending to the functions of the HM on the access network, the DRD functions as the NC node on the MoCA network. At such times, the DRD is responsible for sending beacon packets and MAP packets, as well as data packets, in accordance with the standard protocol of the MoCA network. Accordingly, by ensuring that the timing of the access network and the timing of the MoCA network are closely coordinated, the DRD can use the same Radio-Frequency (RF) layer, physical layer (PHY) and Media Access Control (MAC) layer circuitry to perform both the access network functions and the MoCA network functions.

In order to coordinate the timing of the access network with the MoCA network to enable the DRD to effectively perform both the DRD access node functions and the DRD MoCA node functions, the DRD sends a request to the head-end node of the access network when attempting to gain admission to the access network. The request alerts the head-end node to reserve transmission slots that the DRD can use to attend to the needs of the MoCA network the DRD intends to form. That is, the DRD will request that the head-end node of the access network set aside times when the DRD can be assured that it will not be needed on the access network.

In addition, it is important that the access network and the home network have transmission cycles that are synchronized to ensure that the relative timing of the two networks remains stable from cycle to cycle. For example, reserved slots in the access network should occur at times when the DRD is required to attend to the home network (e.g., send home network beacons). Therefore, the DRD will establish the relative timing of the cycles of the access network with respect to the timing of the cycles of the home network.

In one example in which the access network is a HiNOC network, times will be reserved by the head-end node during which the DRD can be assured that no control messages will be sent. Such control message include Pd (Probing downstream), Pu (Probing upstream) or MAP packets. Furthermore, no information will be scheduled for delivery to the DRD during the reserved times. Likewise, if the access network is a c.LINK network, time will be set aside when no Beacon or MAP packets will be sent and no packets will be scheduled for delivery to the DRD on the access network.

In addition, the DRD is configured as the MoCA network controller, and uses MAPs transmitted by the Head-end Node of the access network to determine when to schedule transmission of packets within the MoCA network. This ensures that the DRD does not attempt to transmit or received packets on the home network when the packets are scheduled to be delivered or received by the DRD over the access network. Since the DRD is a member of both the access network and the MoCA network, the DRD can pass data packets received over the access network to nodes on the MoCA network, and data packets received over the MoCA network to the headend of the access network, with minimum latency.

In accordance with one embodiment of the disclosed method and apparatus, the DRD is coupled to each network through a port that maintains a constant impedance whether the DRD is servicing the access network or the home network.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
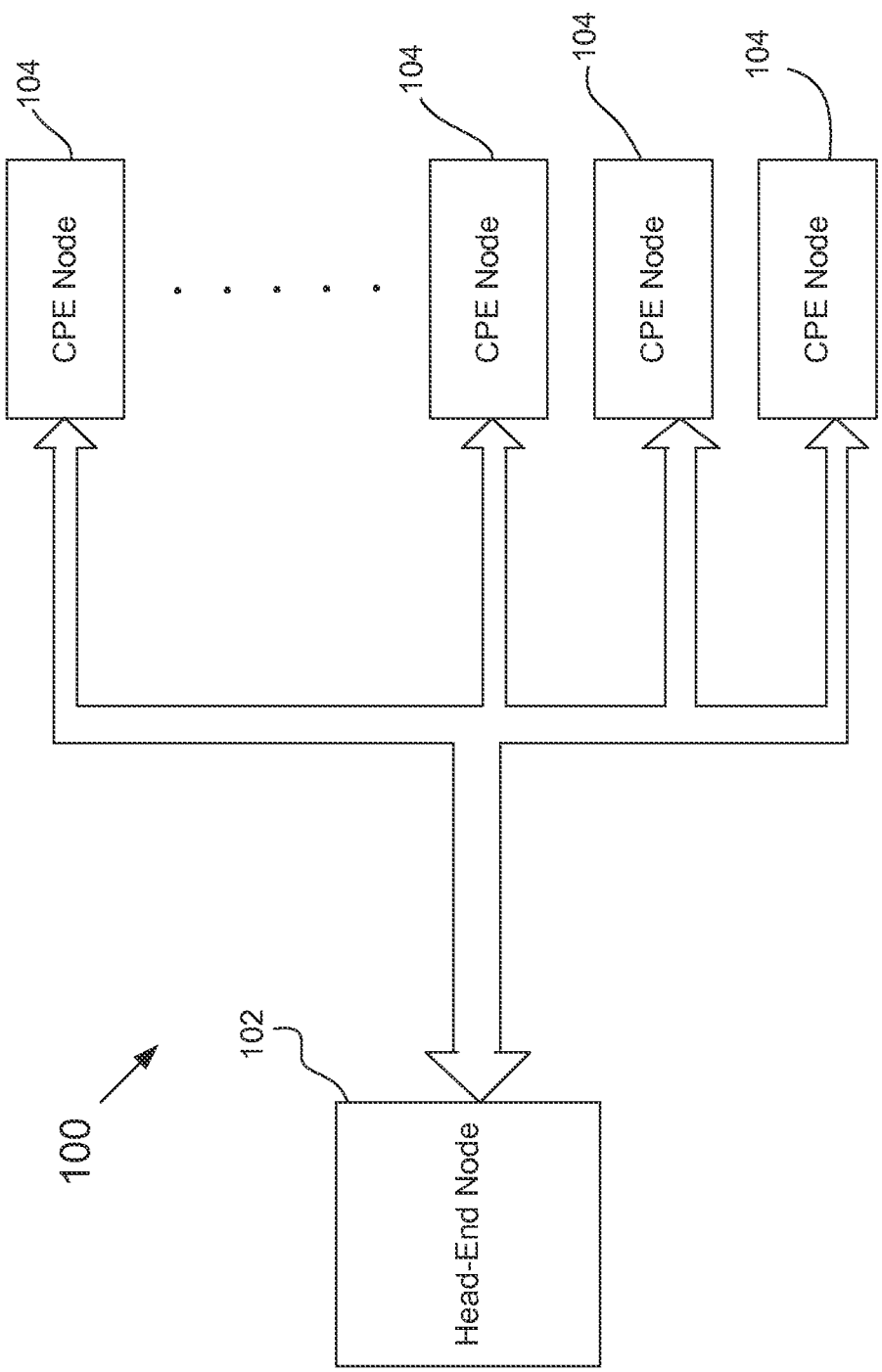
FIG. 1 is a simplified block diagram of an access network.
Figure 2:
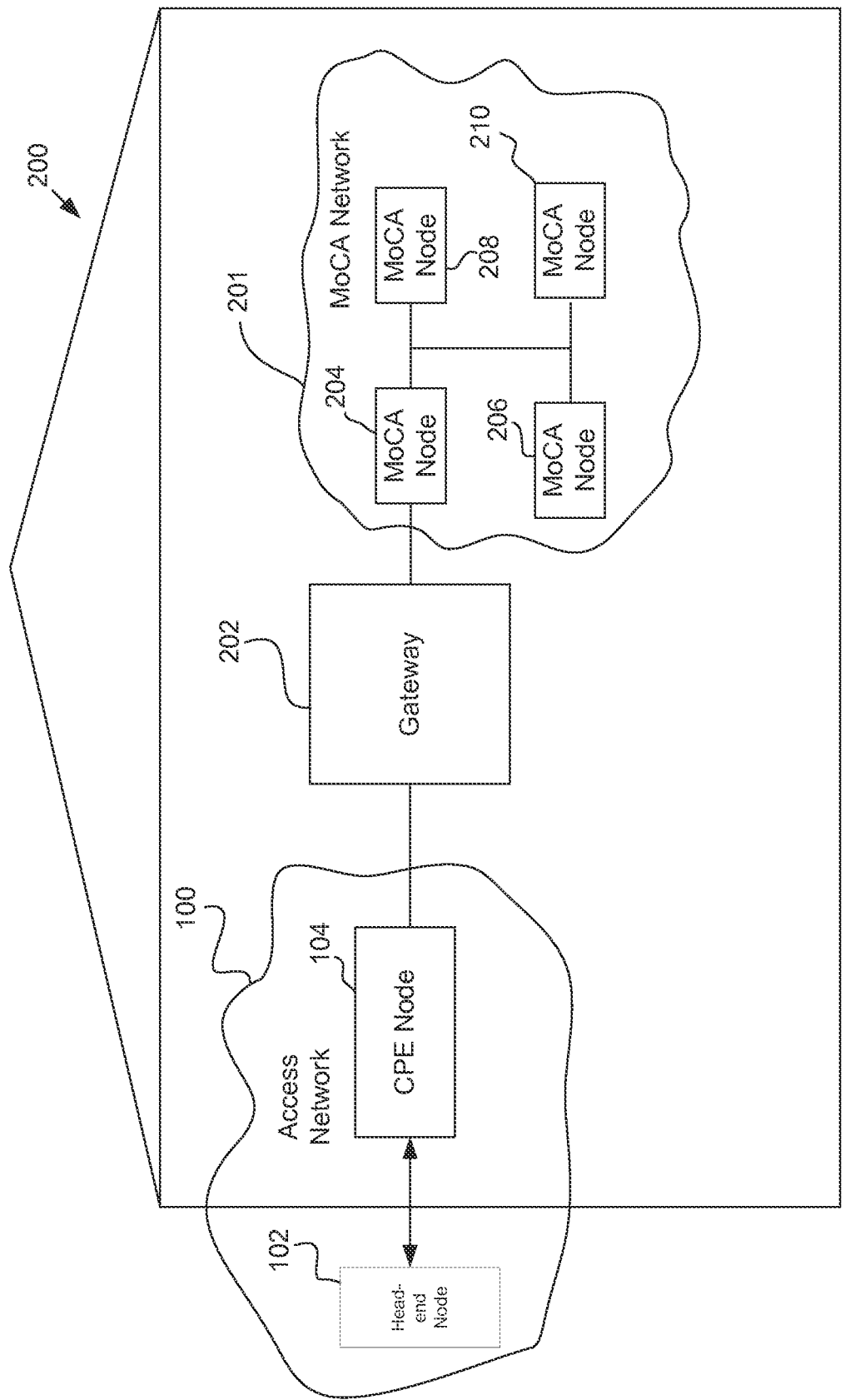
FIG. 2 is a simplified block diagram of a home with both a MoCA network and a CPE that is part of an access network.
Figure 3:
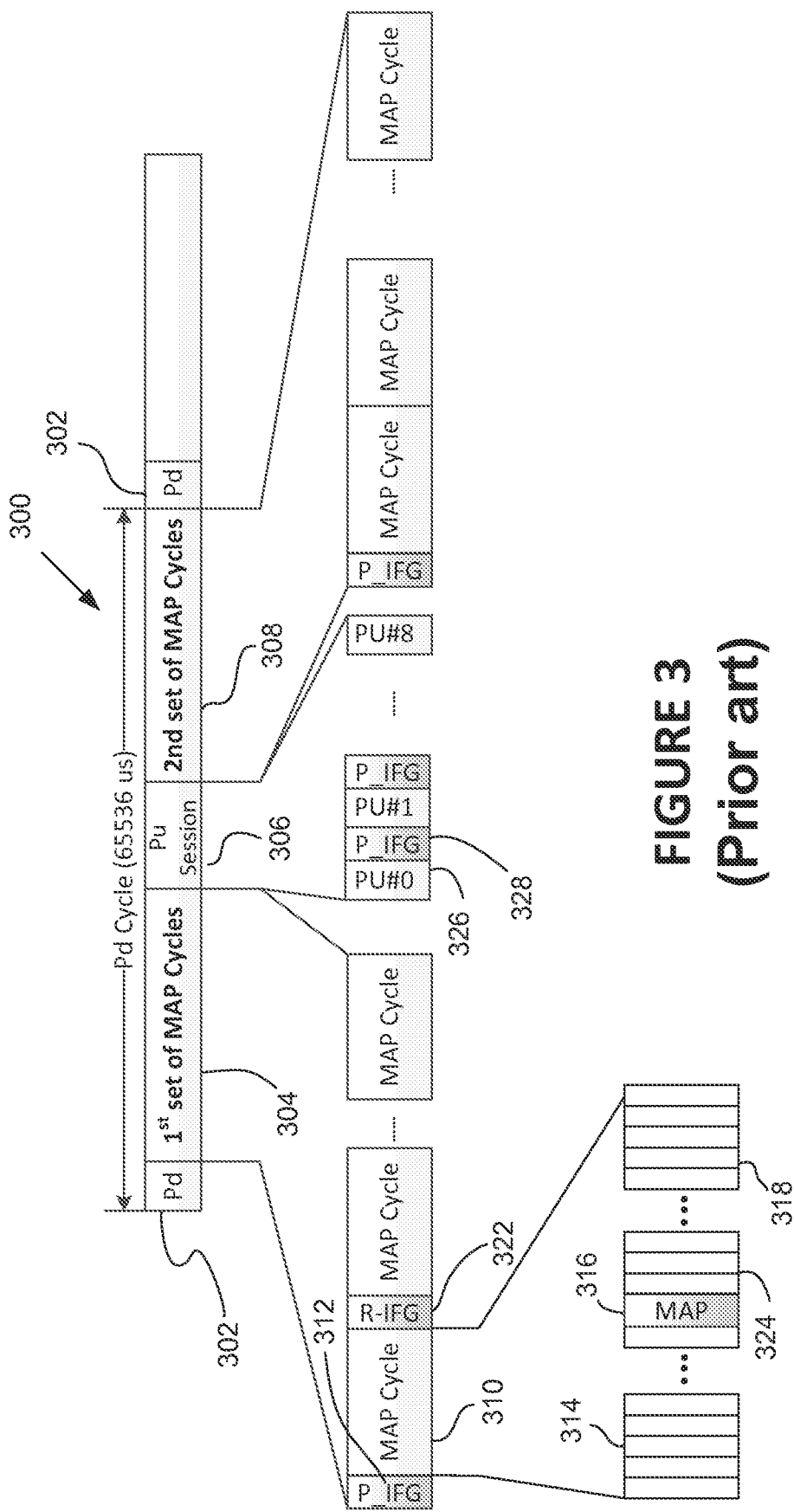
FIG. 3 is a simplified timing diagram of the transmissions that occur on a HiNOC network.
Figure 4:
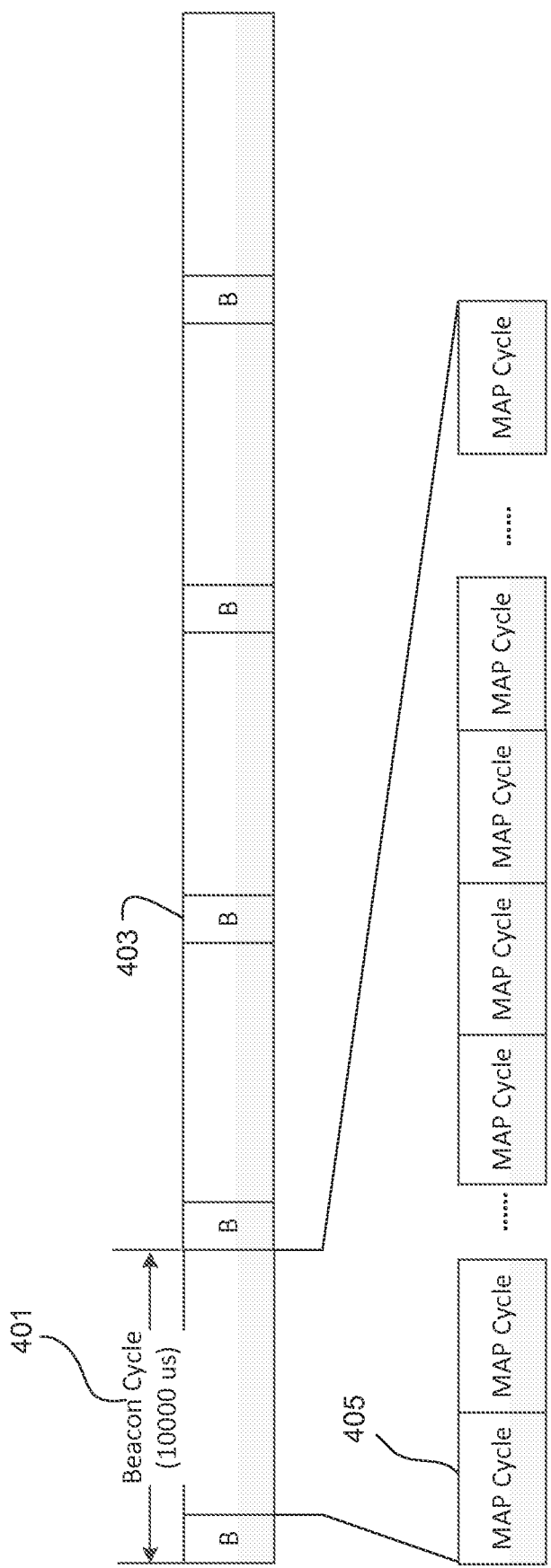
FIG. 4 is a simplified timing diagram of the transmissions that occur on a MoCA network.
Figure 5:
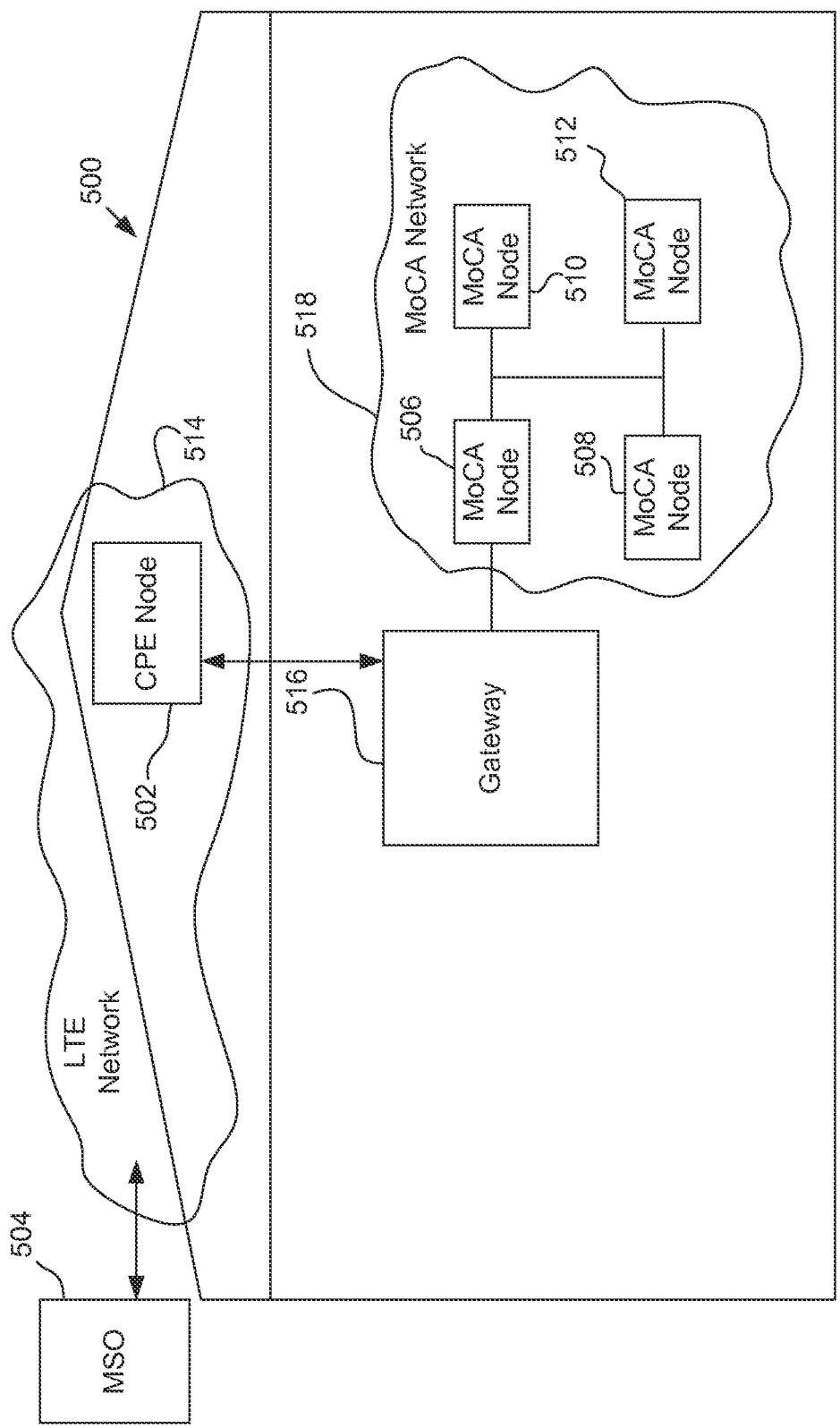
FIG. 5 is a simplified block diagram of a home in which an LTE terminal is used to provide content from an MSO to the MoCA nodes within the home.
Figure 6:
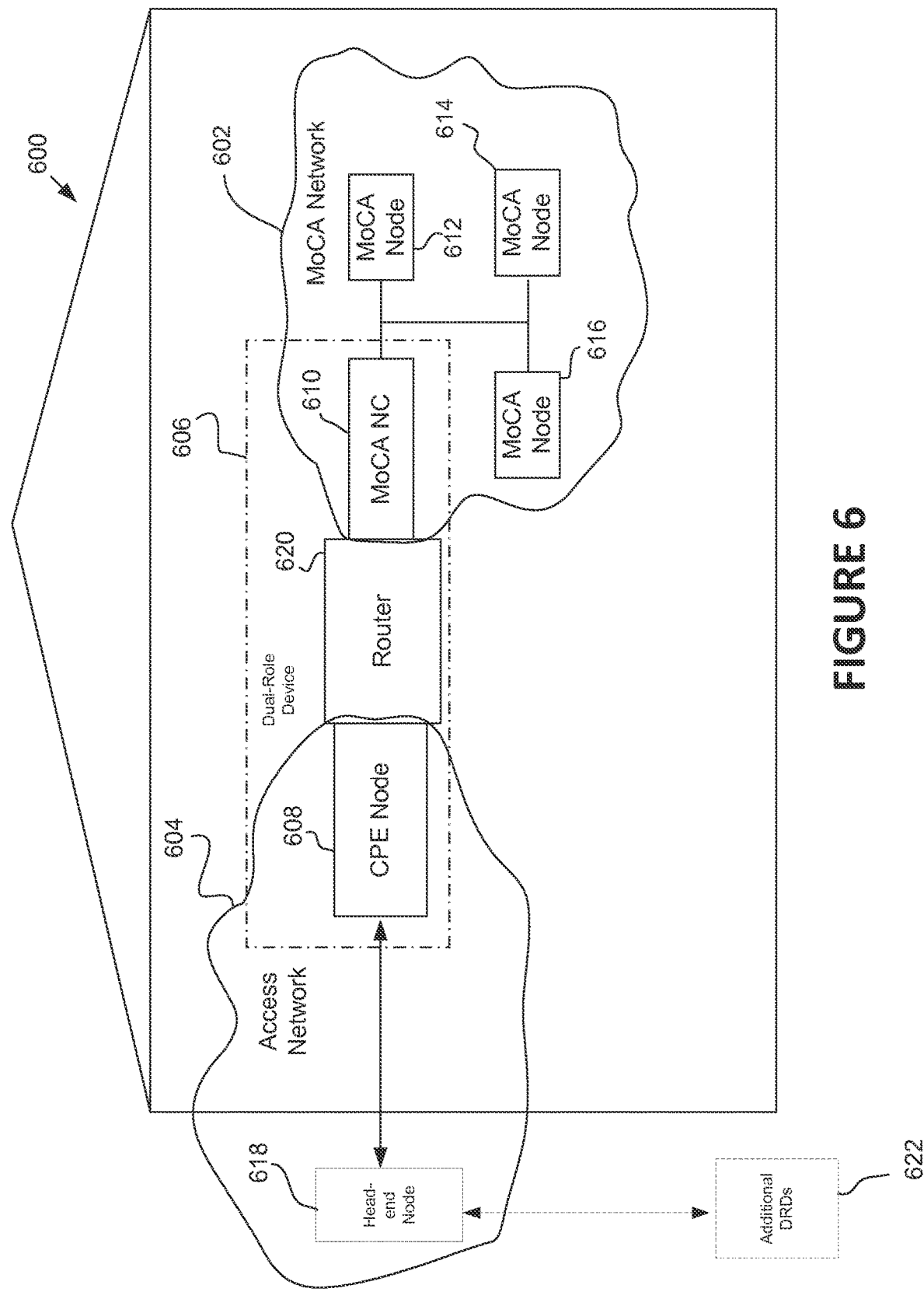
FIG. 6 is a simplified block diagram of a home with a home network and a customer premise equipment (CPE) node of an access network, further comprising a dual-role device (DRD) that functions as the CPE node in the access network and as a Network Controller (NC) in the home network.

FIG. 6 is a simplified block diagram of a home 600 in which a dual-role device (DRD) 606 is a member of both an access network 604 and a home network 602. In addition, several other DRDs 622 may also be members of the access network 604. Each operate essentially in the same manner. The DRD 606 functions as a CPE node 608 within a first network operating in accordance with a first network protocol, such as an access network 604 and as a Network Controller (NC) 610 within a second network operating in accordance with a second network protocol, such as a the home network 602. In one embodiment, the home network 602 is any type of managed network. For the purposes of this discussion, a managed network is defined as a network in which access to the network is scheduled by one of the nodes. In one such embodiment, the home network is a managed mesh network. For the purposes of this discussion, a mesh network is defined as a network in which any node on the network can communicate directly with any other node on the network. In the embodiment shown in FIG. 6, the home network 602 operates in compliance with networks specified by the well-known Multimedia over Coax Alliance (MoCA), such as a MoCA 2.0 network. In addition to the DRD 606 which functions as the NC 610 for the home network 602, several other home network nodes 612, 614, 616 are shown in FIG. 6. In the example shown in FIG. 6, these nodes are MoCA nodes. Those skilled in the art will appreciate that in alternative embodiments, there may be more or less nodes in the home network 602 and that the home network may conform to a protocol other than that specified by MoCA.

The access network 604 is a managed access network. In one embodiment, the access network operates in compliance with the well-known HiNOC (High performance Network Over Coax) standard. In an alternative embodiment, the access network operates in compliance with the well-known c.LINK standard. Other access networks are contemplated as being within the scope of the disclosed method and apparatus, as will be understood by those skilled in the art. The access network 604 allows information to flow between the CPE node 608 implemented by the DRD 606 and a head-end node 618. In many such embodiments, other CPE nodes (not shown) would also transmit to and receive communications from the head-end node 618.

Figure 7A:
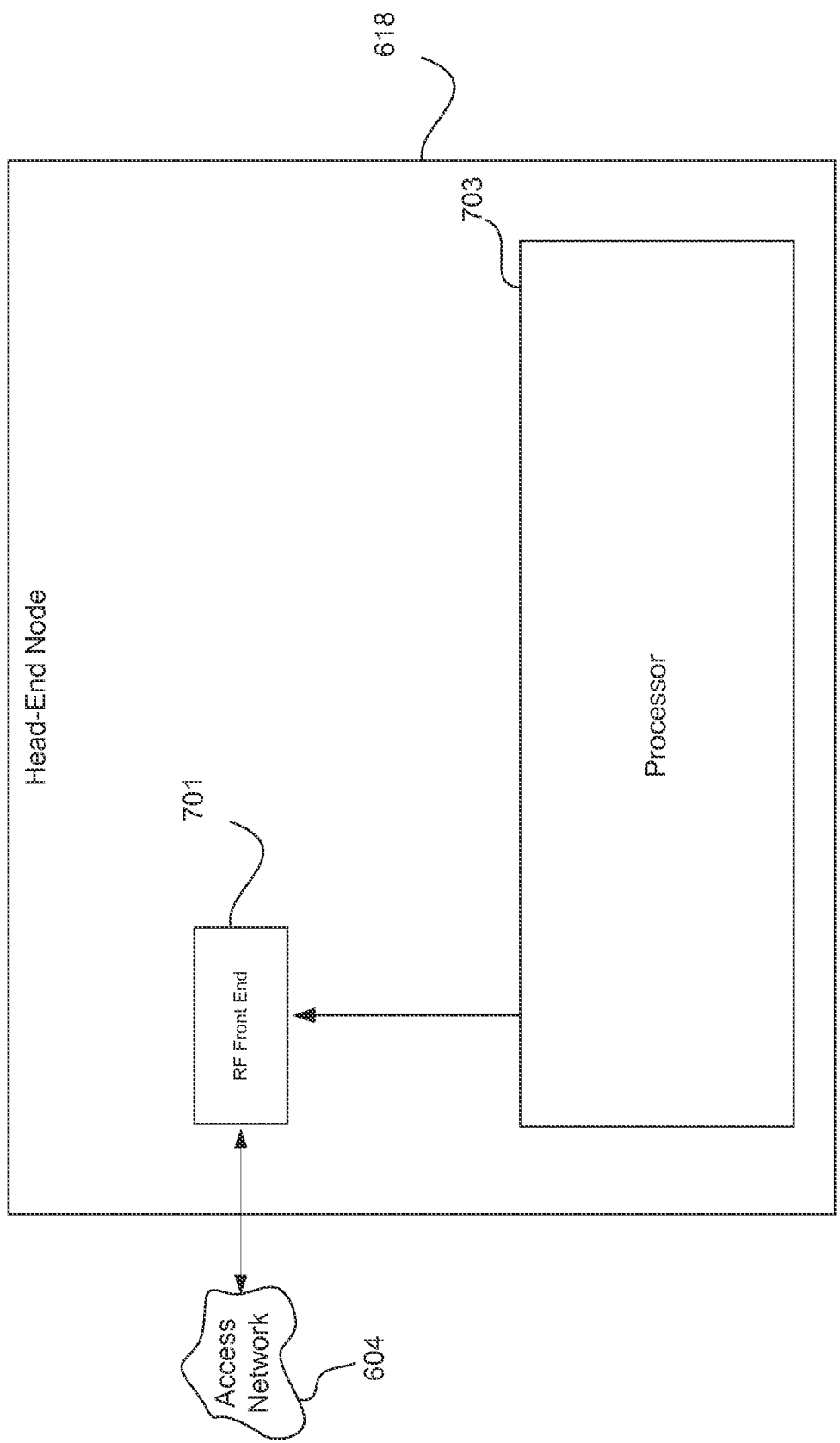
FIG. 7*a* is a simplified block diagram of the logical architecture of a head-end node.

FIG. 7*a* is a simplified block diagram of the logical architecture of a head-end node 618. The head-end node has an RF front end 701. The RF front end receives and transmits signals to the access network 604. The RF front end is coupled to a processor 703. The processor 703 controls the functions of the head-end node 618. It implements all the necessary functions like the PHY layer, MAC layer including the scheduling algorithms for traffic allocations on the access network, and network managements. It should be understood by those skilled in the art that the processor 618 may be implemented by a plurality of processors operating in coordination or independently to perform the tasks of the processor 618. Alternatively, the processor 618 is implemented by one or more hardware circuits, firmware modules and processors, wherein these hardware circuits, firmware modules and processor operate in coordination or independently.

Figure 7B:
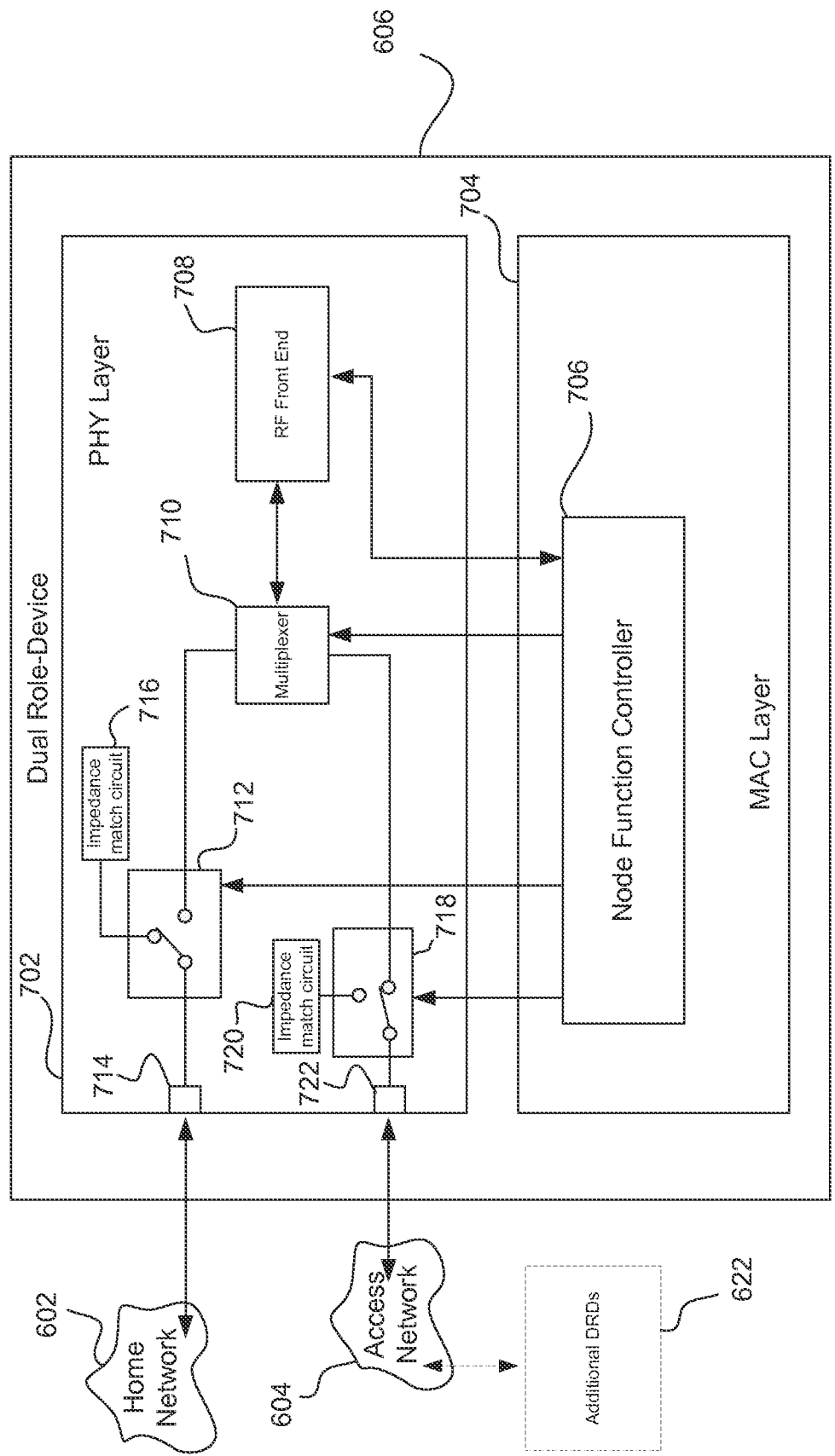
FIG. 7*b* is a simplified block diagram of the logical architecture of a DRD in accordance with one embodiment of the presently disclosed method and apparatus.

FIG. 7*b* is a simplified block diagram of the logical architecture of a DRD 606 in accordance with one embodiment of the presently disclosed method and apparatus. The functions of the DRD comprise a physical (PHY) layer 702 and a Media Access Control (MAC) layer 704. The PHY layer 702 is responsible for generating signals to be transmitted over the network media (i.e., the coaxial cables, etc.) and for receiving signals from the network media in accordance with the OSI (Open Systems Interconnection) model of computer networking. The PHY layer 702 modulates signals to be transmitted and demodulating signals received in accordance with the OSI model of computer networking. The PHY layer includes all the Radio-Frequency (RF) functions.

A Node Function Controller (NFC) 706 resides within the MAC layer 704. In accordance with one particular embodiment of the disclosed method and apparatus, the NFC 706 resides in a sub-layer of the MAC layer 704. The NFC 706 selects between a first network mode, such as Home Network mode, and a second network mode, such as Access Network mode. When operating in Access Network mode, the DRD 606 functions as a CPE node on the access network 604. When operating in Home Network mode, the DRD 606 assumes the role of network controller (NC) on the home network 602. The first network mode and the second network mode are mutually exclusive in time. Therefore, the DRD 606 will operate in only one or the other mode, but cannot operate in both modes concurrently.

In accordance with one embodiment of the disclosed method and apparatus, the NFC 706 places the DRD 606 in Home Network Mode by controlling a multiplexer 710 having a signal input, a control input, a first output and a second output. The signal input is coupled to the output of the RF front end 708. The control input is coupled to the NFC 706. The first output of the multiplexer 710 is coupled to a first impedance match switch 712. The second output from the multiplexer 710 is coupled to the second impedance match switch 718. In Home Network mode, the NFC 706 controls the first impedance match switch 712 to couple a first network port 714 to the RF front end 708 through the multiplexer 710. The first network port 714 is also coupled to the home network 602. A second impedance match switch 718 couples a second network port 722 to a second impedance match circuit 720, thus providing a desired impedance to the access network coupled to the second network port 722.

In Access Network mode, the NFC 706 controls the multiplexer 710 to couple the RF front end 708 to the second output of the multiplexer 710. The NFC 706 also controls the second impedance match switch 718 to couple the multiplexer output to the second network port 722 and thus provide a path from the RF front end 708 to the access network 604 through the multiplexer 710 and the second impedance match switch 718. Concurrently, the NFC 706 sets the first impedance match switch to couple the first network port to the first impedance match circuit 716.

In one embodiment of the disclosed method and apparatus, the home network 602 and the access network 604 share the same port and operate on the same physical medium (like coax cable).

In an alternative embodiment, the multiplexer 710 is a switch that selectively couples either the first impedance match switch 712 or the second impedance match switch 718 to the RF front end 708.

Each of the two impedance match circuits 716, 720 have an impedance that is matched to the associated output of the multiplexer 710. Accordingly, when the impedance match circuit 716, 720 is coupled to the associated network port 714, 722, the impedance seen by the associated network 602, 604 will be the same as when the network port 714, 722 is coupled through the multiplexer 710 to the RF front end 708. By ensuring that the impedance seen by each network remains constant when the DRD 606 changes between Home Network mode and Access Network mode, the other nodes of each of the two networks will not be negatively impacted by the change in the mode of the DRD 606. Those skilled in the art will recognize that if the impedance presented by the RF front end is the same for both the Access Network mode and the Home Network mode, then only one impedance match circuit is required (i.e., each network port 714, 722 can be alternatively coupled to the same impedance match circuit).

It should be noted that in an alternative embodiment, an output buffer/amplifier may be associated with each network port. In such an embodiment, the impedance seen by the network is maintained constant either by ensuring that the output buffer/amplifier has a constant impedance when the RF front end is coupled to the other network port, or the input to the buffer/amplifier must be switched to a constant impedance source. In yet another alternative embodiment, the output of the buffer/amplifier is disconnected from the network port and an impedance matching circuit is coupled to the network port to ensure that the impedance remains constant as the DRD 606 changes modes.

In accordance with one embodiment of the presently disclosed method and apparatus, the logical structures shown in FIG. 7b may be implemented by one or more processors. Such processors may perform some or all of the functions of one or more of the logical structures. Alternatively, the function can be performed by a combination of processors and dedicated hardware, or dedicated hardware controlled by state machines. Other combinations of hardware, firmware and software are possible as well, as will be clear to those skilled in the art. In accordance with one embodiment of the disclosed method and apparatus, regardless of how the DRD 606 is implemented, the same RF front end 708 and MAC layer 704 are used to implement the CPE node 608 and the home network NC node 610. That is, by performing functions associated with either the CPE node 608 or the home network NC node 610, but not both concurrently, a minimum amount of resources are required to implement the DRD 606. The timing of the DRD 606 (i.e., when the DRD 606 operates in Access Network mode and when it operates in Home Network mode) will be discussed in detail below.

In addition to performing the functions associated with the CPE node 608 and NC node 610, the DRD 606 also performs functions associated with a bridge/router 620. That is, the DRD 606 routes packets between nodes on the access network and nodes on the home network. Accordingly, in one embodiment of the disclosed method and apparatus, the DRD 606 has a learning content addressable memory (CAM) table for packet switching between the access network and the home network. Such packet switching and routing functions are well-known to those skilled in the art.

Figure 8:
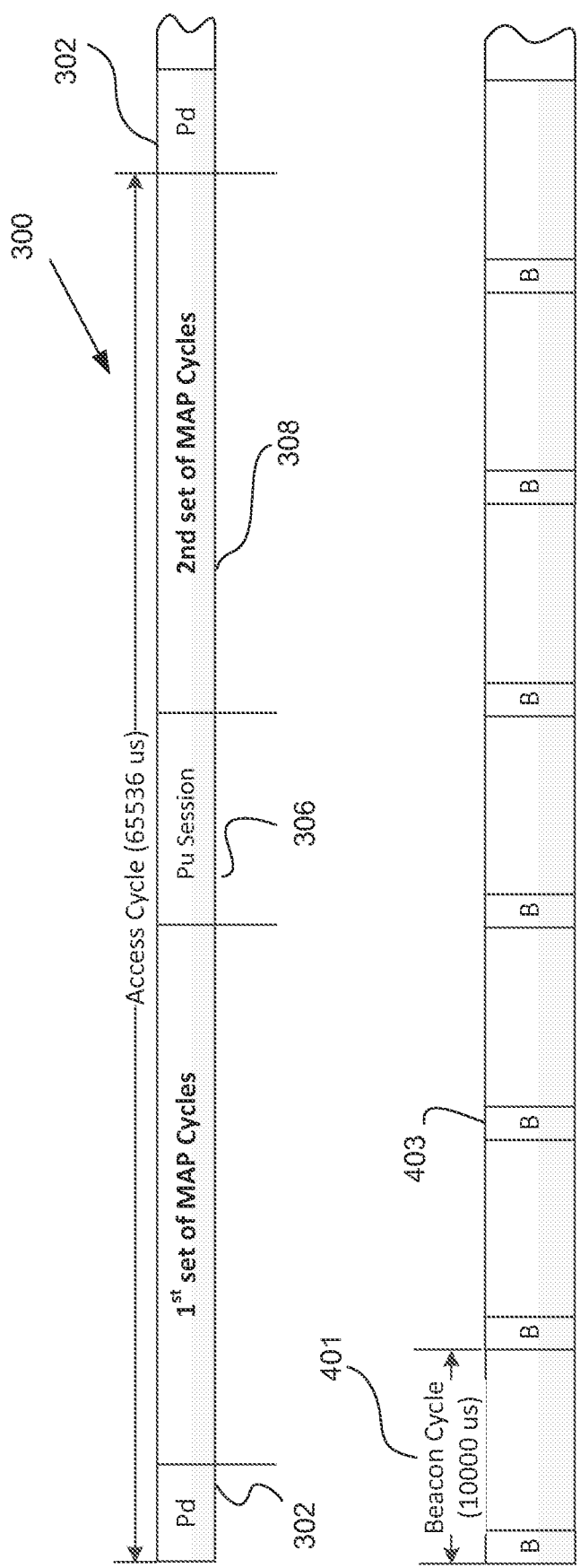
FIG. 8 is a timing diagram showing the relative timing of the access network and the home network in accordance with one embodiment of the disclosed method and apparatus.

FIG. 8 is a timing diagram showing the relative timing of an access network and a home network. The length of an access cycle 300 in accordance with one embodiment shown in FIG. 8 in which the access network is a HiNOC network is typically 65,636 μs. In contrast, the length of a beacon cycle is 10,000 μs for a home network that complies with the MoCA standard. Therefore, an odd number of beacon cycles 401 (i.e., 6.5536) occur in the time typically required for one access cycle 300. Since the timing of the two networks are not synchronous, the relative timing of the beacons 403 within the home network 602 will be random. Accordingly, the time at which control packets and MAP packets are transmitted in each network will be random with respect to the other network. Such random timing means that the DRD 606 will not be able to service both the access network and the home network using the same components without risking packet loss. That is, since the components of the DRD 606 can only service one network at a time, a minimum cost DRD 606 cannot be achieved without synchronizing the networks.

In order to address this problem, the access network's access cycle length can be adjusted by the processor 703 (see FIG. 7a) using one of two different schemes, either off-line or on-line. In the off-line scheme, the access cycle length of the access network is configured by the network operator before or during network operation. In the on-line scheme, the DRD 606 participates in an access network admission process during which the DRD 606 generates a request for the access network to head-end node 618 to adjust the duration of the access cycle 300 to be an integer multiple of the beacon cycles 401 of the home network 602. In one embodiment, the head-end processor 703 coordinates with the network management system. The network management system provides necessary commands to adjust the access cycle 300. By adjusting the access cycle 300 of the access network 604 to be an integer multiple of the beacon cycle 401 of the home network 604, each beacon 403 of the home network will occur at a consistent time with respect to the access cycle 300. Since the DRD 606 is the NC of the home network when operating in Home Network mode, the DRD 606 can schedule the transmissions on the home network 602 to conform to the access network timing. Therefore, the DRD 606 can set the relative starting time of each beacon cycle 401. The start time of the beacon cycle 401 determines when the beacons are to be transmitted with respect to the timing of the access cycle 300 (i.e., the start of a beacon cycle 401 can be set in the home network relative to the start of the access cycle 300).

Figure 9:
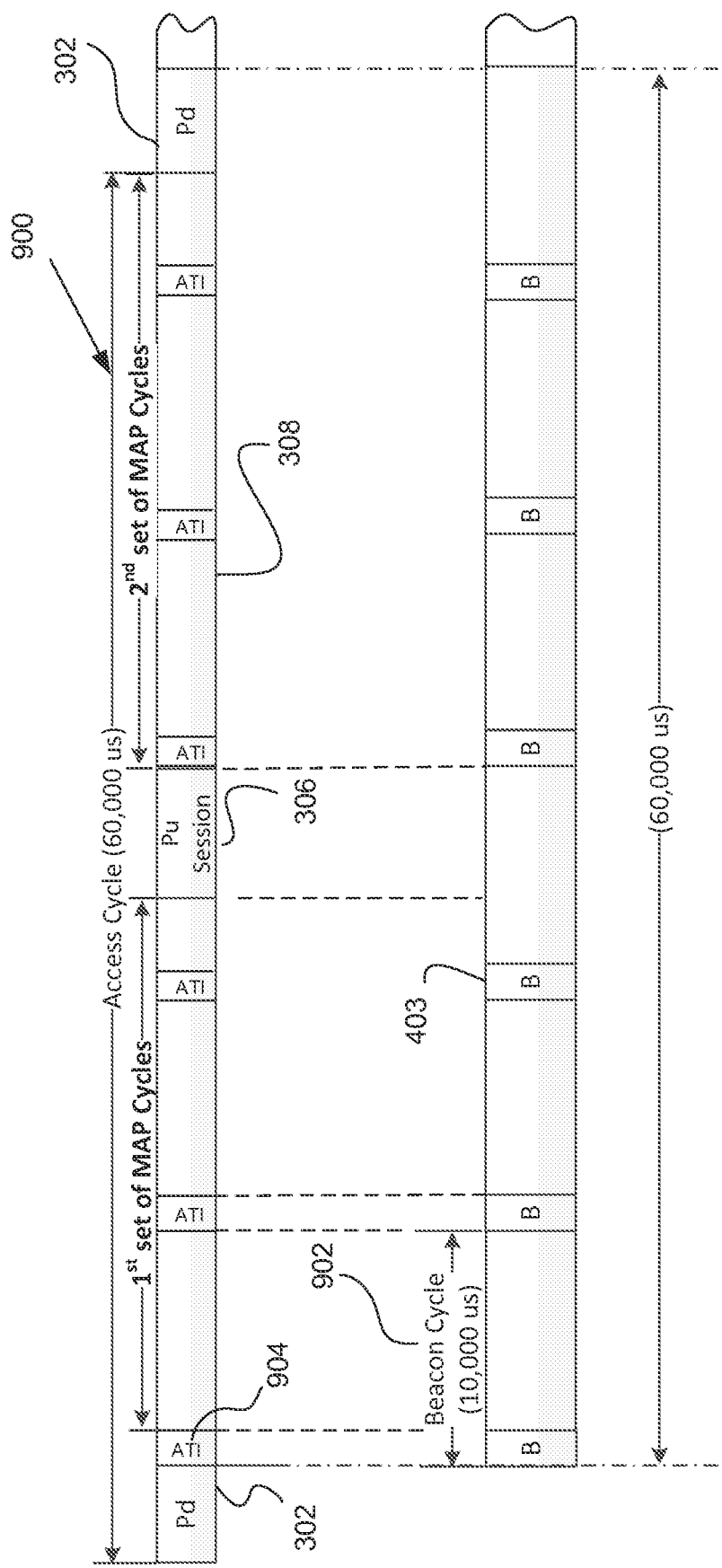
FIG. 9 is a timing diagram showing the relative timing of an access cycle of an access network with respect to a beacon cycle of a home network in accordance with an embodiment of the disclosed method and apparatus in which the access network has adjusted the timing of its access cycle to allow the DRD to synchronize the home network to the access cycle.

FIG. 9 is a timing diagram showing the relative timing of a transmission cycle of a first network, such as an access cycle 900 of the access network 604 with respect to a transmission cycle of a second network, such as a beacon cycle 902 of the home network 602 in accordance with an embodiment of the disclosed method and apparatus. In accordance with this embodiment, the DRD 606 has requested that the access network adjust the timing of its access cycle to allow the DRD 606 to synchronize the home network to the access cycle 900. The DRD 606 provides the head-end node 618 of the access network 604 with the length of the beacon cycle 902. The head-end node 618 then adapts the access cycle 900 to be an integer multiple of the beacon cycle 902 such that none of the control packets (i.e., the Pd and Pu session) occur during a beacon 403. In addition, the DRD 606 requests that the head-end node 618 of the access network 604 establish Absence Time Intervals (ATIs) 904 during which no access network transmissions are scheduled to be transmitted to or from the DRD 606. In accordance with one embodiment, the DRD 606 indicates to the head-end node 618 both the length and the periodicity of the needed ATIs. In response to the request by the DRD 606, the head-end node 618 establishes the relative starting time, duration and period of ATIs 904, and sends the schedule to the DRD through a control message. In one embodiment, the relative start time of one or more ATIs 904 is also included in the request message sent to the head-end of the access network by the DRD. In an alternative embodiment, the DRD 606 can specify both a start and stop time for a first ATI 904 and an interval between subsequent ATIs 904. Those skilled in the art will recognize that there are several alternative ways in which the DRD 606 can communicate to the head-end node 618 when the DRD 606 will not be present on the access network (i.e., will be occupied with the home network).

In addition to synchronizing the access cycle 900 with the beacon cycle 902 and establishing ATIs 904, the DRD 606 determines when control packets (i.e., Pu session and Pd packets) are going to be sent on the access network. The NFC 706 will use knowledge of when such control packets are to be sent on the access network to ensure that the DRD 606 is in Access Network mode. Since the DRD 606 will not be in Home Network mode during these times, the MAC layer 704 of the DRD 606 uses that information to refrain from scheduling any transmissions that involve the DRD 606 during times when control packets (i.e., Pu session and Pd packets) are going to be sent on the access network 604. Accordingly, the DRD 606 can avoid the possibility that it will be needed on both the access network 604 and the home network 602 at the same time. In one embodiment, more than one DRD will be in the access network 604. In one such embodiment, the head-end will receive an ATI schedule from the network operator. In one such embodiment, a device under the control of, or technician working for, the MSO that operates the access network will provide the schedule to the head-end. In one such embodiment, the schedule is derived from information provided by the head-end node 618 to the network operator. Alternatively, the network operator receives the information from a technician in the field or from a field office of the MSO. In one embodiment, the schedule for each ATI can be independent. Accordingly, the ATI of one DRD can overlap with the ATI of another DRD.

The DRD 606 must also take into account the schedule established by the head-end node 618 for sending data packets to and receiving data packets from the DRD 606, by using the MAPs from the head-end of the access network. It will be clear that the DRD 606 will not be able to schedule any data packets to be sent or received by the DRD 606 over the home network 602 at the same time as data packets are to be sent or received by the DRD 606 over the access network 604, since the DRD 606 cannot be in both Access Network mode and Home Network mode at the same time. However, the MAC layer 706 can schedule other nodes of the home network to communicate with one another during times permitted by the home network protocol whether the DRD 606 is in Access Network mode or Home Network mode. For example, the DRD 606 will be in Access Network mode during the Pu Session 306 shown in FIG. 9. However, the Pu Session 306 occurs during a portion of the beacon cycle 902 when the home network NC node 608 can schedule packets to be transmitted and received by nodes on the home network 602. Therefore, even though the MAC layer 704 of the DRD 606 cannot schedule packets to be transmitted or received by the NC node 608, the MAC layer 704 can schedule communications between other nodes on the home network 602. This is possible because such communications between nodes of the home network other than the NC node 608 do not require the presence of the NC 608 on the home network 602.

Figure 10:
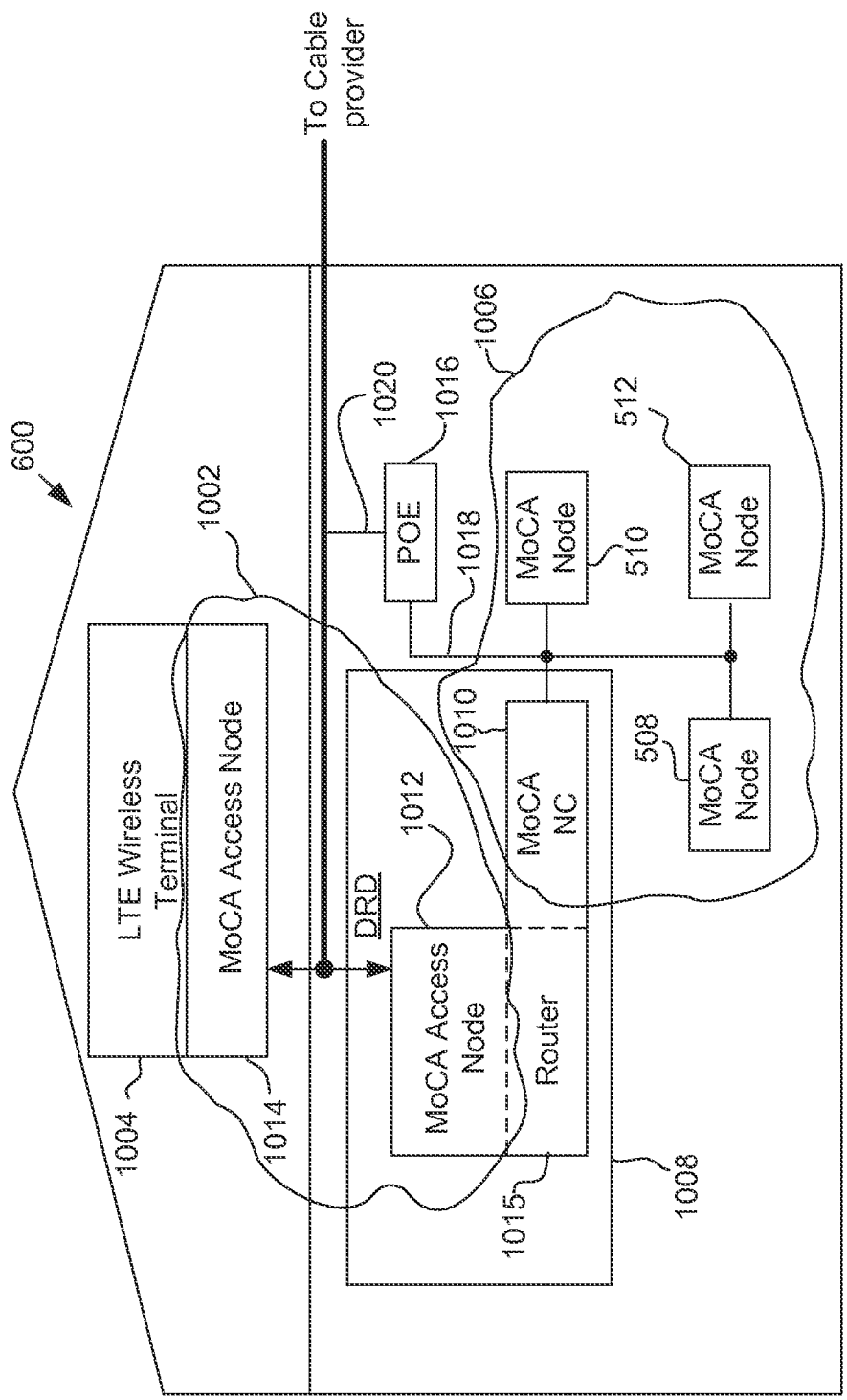
FIG. 10 is an illustration of one embodiment of the disclosed method and apparatus in which a wireless access network is used by an MSO to communication content to a user's home.

FIG. 10 is an illustration of one embodiment of the disclosed method and apparatus in which a wireless access network, such as an LTE (Long-Term Evolution) network or WiMAX (Worldwide Interoperability for Microwave Access) network, is used by an MSO to deliver content to a user's home 1000, or provide general broadband access. As shown in FIG. 10, a two-node network 1002, such as a MoCA or a c.LINK network, is used to communicate information from an access point (e.g., wireless terminal) 1004 of the wireless access network to a home network 1006 that distributes the content to users within the home 600. In one embodiment, the home network 1006 is a MoCA network as well. In accordance with one embodiment of the disclosed method and apparatus, the home network 1006 is a mesh network, such as a MoCA 2.0 compliant network.

Accordingly, in one embodiment of the disclosed method and apparatus, two MoCA networks 1002, 1006 are established within the home 600. The first MoCA network 1002 is a two-node MoCA access network that communicates between a first MoCA access node 1014 coupled to a wireless Terminal 1004 and a second MoCA access node 1012. The functions of the second MoCA access node 1012 are performed by a DRD 1008. The second MoCA network 1006 is a MoCA mesh network, such as a MoCA 2.0 compliant network. The second MoCA network 1006 distributes to users throughout the home 600, content received via a router 1015 from the MoCA access node 1012. The DRD 1008 also performs all of the functions of the NC 1010 for the home network 1002. In addition, the DRD 1008 performs all of the functions of a router to allow packets to be routed through the DRD 1008 between the two-node MoCA network 1002 and the home network 1006.

In accordance with one embodiment of the presently disclosed method and apparatus, both the MoCA access network 1002 and the MoCA mesh network 1006 use the internal coaxial cabling of the home 600. Therefore, the two MoCA networks share the same medium. In accordance with one embodiment, the two networks are coordinated by the DRD 1008. In this way, the DRD 1008 can perform the functions of the MoCA access node 1012 in the MoCA access network 1002 and the functions of the MoCA NC 1010 in the MoCA home network 1006 using the same resources (i.e., processor, PHY layer components, etc.). Alternatively, the two networks can be isolated from one another. For example, some homes have a point of entry (POE) 1016 that isolates the home network 1006 on the home side of the POE 1016 from non-home side of the POE 1016. Accordingly, in one embodiment of the disclosed method and apparatus, the MoCA access network 1002 is coupled to the home coaxial cabling on the non-home side of the POE 1016.

In accordance with one embodiment, the MoCA access network 1002 and the MoCA home network 1006 operate on the same frequency. This is possible because the DRD 1008 can synchronize the timing of the beacon cycles of the two networks in order to ensure that the beacons transmitted on the first network 1002 do not overlap in time with the beacons of the second network 1006. In addition, the fact that there are only two nodes in the MoCA access network 1002 and the relatively low bandwidth requirement of that network 1002, make it reasonable for the two networks 1002, 1006 to share the same frequency. In one embodiment, the node coupled to the access point 1004 operates as the NC for the access network 1002. The DRD 1008 operates as the NC 1010 for the MoCA home network 1006. The MoCA NC 1010 receives information from the MoCA access node 1012 indicating when the DRD 1008 will need to be available to perform functions associated with the MoCA access network 1002. Accordingly, the MoCA NC 1010 will not schedule any activity on the MoCA home network during times when the MoCA access network 1002 is active. In an alternative embodiment, the two networks 1002, 1006 operate on different frequencies, but are coordinated to ensure that the DRD 1008 does not have to transmit or receive on both the MoCA access network 1002 and the MoCA home network 1006 at the same time.

In one embodiment, the DRD 1008 operates as the NC for the access network 1002. In addition, the DRD 1008 operates as the NC 1010 for the MoCA home network 1006. Accordingly, the DRD will not schedule any activity on the MoCA home network during times when the MoCA access network 1002 is active. In an alternative embodiment, the two networks 1002, 1006 operate on different frequencies, but are coordinated to ensure that the DRD 1008 does not have to communicate (i.e., either transmit or receive) on both the MoCA access network 1002 and the MoCA home network 1006 at the same time.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A network node for operation in a premises, the network node comprising:
    a first network port;
    a second network port;
    a physical (PHY) layer comprising a radio frequency (RF) front end, wherein the RF front end is operable to, at least:
        receive signals from and transmit signals to a first network external to the premises operating in accordance with a first network protocol through the first network port over a first communication medium external to the premises; and
        receive signals from and transmit signals to a second network of the premises and operating in accordance with a second network protocol through the second network port over a second communication medium of the premises; and a node function controller (NFC) that is operable to, at least:
  select a mode of a plurality of modes comprising:
    a first network mode, in which the network node operates as an access network node of the first network external to the premises and does not operate on the second network of the premises; and
    a second network mode, in which the network node operates as a network controller of the second network of the premises and does not operate on the first network external to the premises, wherein the network node operates as a network controller by at least in part scheduling communications for other nodes of the second network of the premises where such communications are directly between or among the other nodes; and
  operate the network node in the selected mode,
wherein the signals received from the first network comprise a Media Access Plan (MAP) for communications over the first communication medium and wherein the NFC operates to generate a MAP for the second network for communications over the second communication medium based, at least in part, on the MAP received from the first network.

2. The network node of claim 1, wherein the first and second networks transmit on the same frequency.

3. The network node of claim 1, wherein the first and second networks transmit on different frequencies, and the PHY layer comprises an RF front end that is switched between operating on the first network at a first frequency in the first network mode and operating on the second network at a second frequency in the second network mode.

4. The network node of claim 1, wherein the MAP generated for the second network ensures that signals communicated by the network node in the first network when the network node is operating as an access network node in the first network are mutually exclusive in time from signals communicated by the network node in the second network operating as a network controller in the second network, but that signals communicated between nodes other than the network node in the first network are allowed to overlap in time with signals communicated by the network node in the second network operating as the network controller in the second network.

5. A network node for operation in a premises, the network node comprising:
  a first network port;
  a second network port;
  a physical (PHY) layer comprising a radio frequency (RF) front end, wherein the RF front end is operable to, at least:
    receive signals from and transmit signals to a first network external to the premises operating in accordance with a first network protocol through the first network port over a first communication medium external to the premises; and
    receive signals from and transmit signals to a second network of the premises and operating in accordance with a second network protocol through the second network port over a second communication medium of the premises; and
  a node function controller (NFC) that is operable to, at least:
    select a mode of a plurality of modes comprising:
      a first network mode, in which the network node operates as an access network node of the first network external to the premises and does not operate on the second network of the premises; and
      a second network mode, in which the network node operates as a network controller of the second network of the premises and does not operate on the first network external to the premises, wherein the network node operates as a network controller by at least in part scheduling communications for other nodes of the second network of the premises where such communications are directly between or among the other nodes; and
    operate the network node in the selected mode,
  wherein the network node operates as a network coordinator for both the first and second networks, and the NFC generates MAPs for the first network and for the second network that ensure that communications of the network node operating in the first network mode are mutually exclusive in time from communications of the network node operating in the second network mode, but that signals communicated between nodes other than the network node in the first network are allowed to overlap in time with signals communicated by the network node in the second network operating as the network controller in the second network.

6. A network node for operation in a premises, the network node comprising:
  a network function controller operable to, at least:
    operate the network node in a first network mode in which the network node functions as a Customer Premises Equipment (CPE) node in a first network, which is a wide area network external to the premises, and does not communicate in a second network, which is a local area network of the premises, by at least in part operating to:
      couple an RF front end of the network node to a first network port;
      decouple the first network port from a first impedance matching circuit; and
      couple a second network port to a second impedance matching circuit; and
    while operating the network node in the first network mode, request admission to the first network, including requesting that the first network adjust transmission cycles on the first network to accommodate operation of the network node in the second network;
    operate the network node in a second network mode in which the network node functions as a network controller node in the second network and does not communicate in the first network, by at least in part operating to:
      couple the RF front end of the network node to the second network port;
      decouple the second network port from the second impedance matching circuit; and
      couple the first network port to the first impedance matching circuit; and
    alternate operation of the network node between at least the first network mode and the second network mode,
  wherein the network function controller operates to request admission to the first network by, at least in part, requesting that a periodic sequence of Absence Time Intervals (ATIs) be established in the first network during which the network node may participate in the second network without participating in the first network and during which network nodes other than the network node may participate in the first network.

7. The network node of claim 6, comprising:
a multiplexer circuit controlled by the network function controller;
a first switching circuit comprising a first terminal coupled to the multiplexer circuit, and a second terminal coupled to the first impedance matching circuit; and
a second switching circuit comprising third terminal coupled to the multiplexer circuit, and a fourth terminal coupled to the second impedance matching circuit.

8. The network node of claim 6, wherein the network function controller operates to select between at least the first network mode and the second network mode based, at least in part, on synchronized medium access timing for the first and second networks.

9. The network node of claim 6, wherein the first network is a managed access wide area network, and the second network is a managed access local area mesh network.

10. The network node of claim 6, wherein the transmission cycles of the first network temporally overlap transmission cycles of the second network.

11. The network node of claim 6, wherein the network function controller operates to synchronize beacon transmission of the network node during the ATIs.

12. A network node comprising:
a first network port;
a second network port;
a physical (PHY) layer comprising a radio frequency (RF) front end, wherein the RF front end is operable to, at least:
  receive signals from and transmit signals to a first network external to the premises operating in accordance with a first network protocol through the first network port; and
  receive signals from and transmit signals to a second network of the premises, operating in accordance with a second network protocol through the second network port,
  wherein at least a portion of first communications over the first network and at least a portion of second communications over the second network occur simultaneously; and
a Media Access Control (MAC) layer coupled to the PHY layer, wherein the MAC layer is operable to, at least:
  select between at least a first network mode, in which the network node operates as a customer premises equipment (CPE) node on the first network external to the premises and does not communicate in the second network of the premises, and a second network mode, in which the network node operates as a network controller (NC) node on the second network of the premises and does not communicate in the first network external to the premises, wherein the network node operates as a network controller by at least in part scheduling communications for other nodes of the second network of the premises where such communications are directly between or among the other nodes; and
  control PHY layer utilization of the first network port and the second network port in accordance with the selected network mode,
  wherein the MAC layer is operable to generate a request for admission to the first network to be transmitted to the first network by the PHY layer while the network node is operating in the first network mode, wherein the request for admission to the first network comprises information regarding medium access of the second network, and
  wherein the request for admission to the first network comprises a request to establish a periodic sequence of Absence Time Intervals (ATIs) in the first network during which the network node may participate in the second network without participating in the first network and during which network nodes other than the network node may participate in the first network.

13. The network node of claim 12, wherein the information regarding medium access comprises information regarding the timing of beacons in the second network.

14. The network node of claim 12, wherein:
the PHY layer comprises a network switching circuit comprising a signal input, a control input, a first output and a second output, wherein the signal input is coupled to the RF front end, the first output is coupled to the first network port, the second output is coupled to the second network port, and the control input is coupled to the MAC layer; and
the MAC layer is operable to send a first control signal to the control input to select the first output and thereby couple the RF front end to the first network port when the network node is operating in first network mode, and to send a second control signal to the control input to select the second output and thereby couple RF front end to the second network port when the network node is operating in second network mode.

15. The network node of claim 14, wherein the PHY layer comprises:
a first impedance match circuit;
a second impedance match circuit; and
at least one switch operable to:
  couple the first impedance match circuit to the first network port and decouple the second impedance match circuit from the second network port, when the RF front end is coupled to the second network port; and
  couple the second impedance match circuit to the second network port and decouple the first impedance match circuit from the first network port when the RF front end is coupled to the first network port.

16. The network node of claim 12, wherein the first network is a managed wide area network, and the second network is a managed home network.

17. The network node of claim 12, wherein:
transmissions on the first network are organized as a continuous stream of access cycles;
transmissions on the second network are organized within a continuous stream of beacon cycles; and
the information regarding medium access of the second network comprises information about the beacon cycles.

18. The network of claim 12, wherein the request for admission to the first network comprises information regarding ATI length; ATI periodicity; and/or ATI starting time for the requested periodic sequence of Absence Time Intervals (ATIs).

19. The network of claim 12, wherein the MAC layer schedules transmission and reception of packets by nodes other than the network node over the second network during an ATI.

20. The network of claim 12, wherein the first network port and the second network port are coupled to a common RF front end through a common multiplexer.

* * * * *